US012783409B2

(12) United States Patent
Stonelake et al.

(10) Patent No.: US 12,783,409 B2
(45) Date of Patent: Nov. 3, 2026

(54) LOGICAL-TO-PHYSICAL MAPPING FOR ENHANCED GRANULARITY DATA STORAGE

(71) Applicant: Micron Technology, Inc., Boise, ID (US)

(72) Inventors: Paul Roger Stonelake, Kihei, HI (US); Anirban Kundu, Bangalore (IN); Sundararajan Sankaranarayanan, Fremont, CA (US); John Paul Mazzie, Austin, TX (US); Eldhose Peter, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/226,798

(22) Filed: Jun. 3, 2025

(65) Prior Publication Data

US 2025/0377789 A1 Dec. 11, 2025

Related U.S. Application Data

(60) Provisional application No. 63/658,330, filed on Jun. 10, 2024.

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS

| | | | |
|---|---|---|---|
| 8,924,629 B1 | 12/2014 | Call et al. | |
| 10,445,244 B2 | 10/2019 | Grochowski et al. | |
| 2016/0342509 A1 | 11/2016 | Kotte et al. | |
| 2022/0188244 A1 | 6/2022 | Ambula et al. | |
| 2023/0409470 A1 * | 12/2023 | Muthiah ............. | G06F 13/1668 |
| 2024/0020033 A1 | 1/2024 | Palmer et al. | |

OTHER PUBLICATIONS

"International Search Report and Written Opinion of the International Searching Authority," issued in connection with Int'l Appl. No. PCT/US2025/032730, dated Sep. 30, 2025 (12 pages).

* cited by examiner

*Primary Examiner* — Chie Yew
(74) *Attorney, Agent, or Firm* — Holland & Hart LLP

(57) ABSTRACT

Methods, systems, and devices for logical-to-physical (L2P) mapping for enhanced granularity data storage are described. A memory system may support write operations according to multiple different write granularities and corresponding data transfer sizes. Entries that map logical addresses to physical addresses within the memory system may include first entries associated with a first data transfer size and second entries associated with a second data transfer size that is greater than the first data transfer size. If the memory system receives a write command that indicates a size of data that is less than or equal to the first data transfer size, the system may update the first entries to indicate a mapping. Data indicated via write commands associated with larger data sizes may be mapped by the second entries. The varying entry structure may support improved write operations and throughput for storage of data at varying granularities.

20 Claims, 4 Drawing Sheets

LOGICAL-TO-PHYSICAL MAPPING FOR ENHANCED GRANULARITY DATA STORAGE

CROSS REFERENCE

The present Application for Patent claims priority to U.S. Patent Application No. 63/658,330 by Stonelake et al., entitled "LOGICAL-TO-PHYSICAL MAPPING FOR ENHANCED GRANULARITY DATA STORAGE," filed Jun. 10, 2024, which is assigned to the assignee hereof, and which is expressly incorporated by reference in its entirety herein.

TECHNICAL FIELD

The following relates to one or more systems for memory, including logical-to-physical (L2P) mapping for enhanced granularity data storage.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
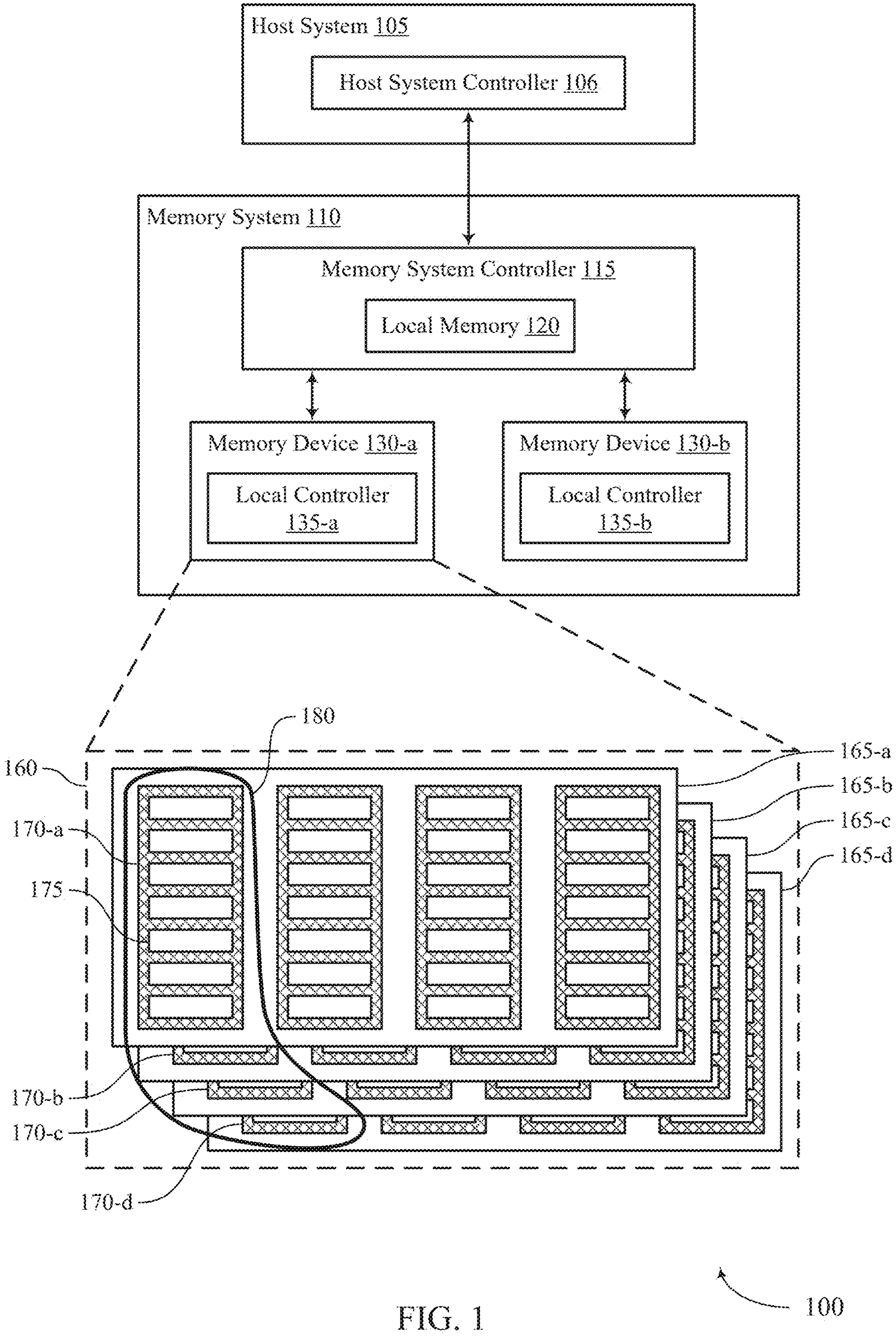
FIG. 1 shows an example of a system that supports logical-to-physical (L2P) mapping for enhanced granularity data storage in accordance with examples as disclosed herein.

Some memory systems (e.g., solid state drives (SSDs), or other types of memory systems) may utilize a cache to temporarily store data before writing the data to memory. In some cases, the memory system may maintain (e.g., in the cache or elsewhere in memory) a logical-to-physical (L2P) table that maps logical addresses of data to physical addresses within the cache, the memory, or both where the data is stored. The memory system may write to the cache and the memory according to a first write granularity (e.g., data transfer size), which may correspond to a first size of data (e.g., 16 kilobytes, or some other size of data) supported by the L2P table of the memory system. For example, the L2P table may include entries that map data according to the first write granularity. In the case that a size of incoming data indicated via a write command from a host system is not aligned with this size boundary (e.g., the size of the data may be larger than 16 kilobytes, the size of the data may be less than 16 kilobytes), the memory system may perform one or more processes (e.g., a read modify write (RMW) operation) to modify the data such that it may fit the storage criteria before writing the data to the cache. The RMW and other types of operations for modifying data granularity before a write may increase background processes for writing data to the cache, transferring the data to the memory, or both, which may increase write amplification while reducing some aspects of user performance and reducing memory usage efficiency. Techniques for more efficient data storage of varying data transfer sizes may be beneficial.

To improve the performance and memory storage within a memory system, the techniques described herein provide for a memory system to support writes according to multiple different sizes. For example, relatively smaller chunks of data may be written relatively frequently to the cache and data may be transferred to the memory using relatively larger chunks of data, or vice versa. The L2P table described herein may include multiple levels to support the varying write sizes within the system. As described herein, the memory system may include multiple (e.g., two or more) levels of L2P entries such that a finer granularity of data may be stored and tracked without the memory system performing RMW operations. For example, a first level, a second level, or both of the L2P table (e.g., the L1 table, the L2 table) may be associated with larger data granularity sizes, while a third level of the L2P table (e.g., a L3 table) may map finer granularities of data to addresses in the cache, the memory, or both. The first and second levels of the L2P table may be associated with the first data granularity, while the third level of the L2P table may be associated with a second data granularity size that is smaller than the first data granularity. The varying data granularities in the L2P entries may support smaller random writes from a host, at least because smaller chunks of data may be mapped within the L2P entries without performing additional operations, such as RMW operations. The L2P entries that support varying data granularities as described herein may enable better memory usage, as finer data granularity may be stored to the memory system without null padding or otherwise unused memory space, thereby improving memory usage and supporting different applications associated with one or more different data sizes.

In addition to applicability in memory systems as described herein, techniques for logical-to-physical mapping for enhanced granularity data storage may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by including mapping entries that support relatively fine granularity/data transfer sizes, which may support more frequent writes of smaller write size with reduced latency and improved accuracy. The memory system may thereby receive and write more granular data without an increase in write amplification factor, which may extend a life cycle of the system and improve performance, among other benefits.

Additionally, or alternatively, techniques for logical-to-physical mapping for enhanced granularity data storage may be generally implemented to improve the sustainability of various electronic devices and systems. As the use of electronic devices has become even more widespread, the amount of energy used and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by supporting various write granularities with reduced operations, which may extend the life of electronic devices and improve efficiency of memory system storage, thereby reducing electronic waste, among other benefits.

Features of the disclosure are illustrated and described in the context of systems, devices, and circuits. Features of the disclosure are further illustrated and described in the context of a memory architecture and flowcharts.

FIG. 1 shows an example of a system 100 that supports logical-to-physical (L2P) mapping for enhanced granularity data storage in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some examples, a cache of the memory system 110 may include a first type of memory cell configured to store a first quantity of bits of information, and one or more memory arrays (e.g., the memory devices 130) may include a second type of memory cell configured to store one or more second quantities of bits of information, where the first quantity of bits may be less than the second quantities of bits to improve a speed for input and output of the cache. The cache may include, for example, one or more SLC memory cells and the memory arrays may include QLC memory cells, or other types of memory cells. In some examples, the cache may be located in the local memory 120 of the memory system controller 115 or elsewhere within the memory system 110.

The cache may include non-volatile memory, volatile memory, or both (e.g., NAND memory, dynamic random access memory (DRAM), or both). For example, the cache may include one or more non-volatile memory cells to store data from the host system 105 before the data is transferred to the memory arrays. The cache may additionally, or alternatively, include volatile memory (e.g., one or more volatile memory cells) to store data from the host system 105, metadata, flash translation layer data, mapping information, other types of data, or any combination thereof. The L2P mapping information for the memory system 110 may be stored in the volatile portion of the cache, the non-volatile portion of the cache, one or more other locations within the memory system 110, or any combination thereof.

The memory cells of the cache may be operable to store data, and may be addressable at a byte-level of granularity. In some examples, the cache may store frequently-accessed data or prefetched data. The cache may be associated with a higher bandwidth and lower access latency relative to the memory cells of the memory arrays of the memory system 110. Accordingly, the cache may provide relatively high bandwidth and relatively low latency access to data, while the memory arrays of the memory device 130 may provide non-volatile and relatively high capacity storage of data.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

The memory system 110 may be coupled with, and may receive commands from, the host system 105. For some commands, the host system 105 may refer to a location of stored data in the memory system 110 (e.g., in the memory devices 130), using an LBA (e.g., assigned by the host system 105) to identify a logical location of the associated stored page 175. The LBA may be mapped to a physical address within the memory of a memory device 130 at which the data is stored. Because the physical address of the data may change (e.g., in response to data being updated by writing the updated data to a different page or transferring data between a cache and a memory array, or the like), the memory system 110 maintain one or more L2P mappings that map LBAs generated by the host system 105 to corresponding physical addresses in the memory system 110. In this manner, the host system 105 can request to read data from the memory system 110 using a same LBA as was used for writing the data even if the data has been moved to a different physical address. Each L2P mapping may be stored in non-volatile memory (e.g., NAND memory), volatile memory (e.g., DRAM memory), or both (e.g., within a cache of the memory system 110), as described herein. In the case that a change is to be made to the L2P mapping, a portion of the L2P mapping may be loaded into a cache (e.g., an SRAM, a NAND cache) of the memory system 110 and changes may be performed.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples of the system 100, to support accurate storage of data within multiple-level memory cells (e.g., QLC cells or other types of cells in the memory arrays), the memory system 110 may perform two-pass programming (e.g., a coarse programming operation followed by a fine programming operation). However, such programming may incur relatively high latency at the memory system 110, which may prevent host data from being directly written to the QLC blocks (e.g., due to the latency inhibiting the memory system 110 from matching the data transfer speed from the host system 105). To prevent losing host data, the memory system 110 may include an intermediate layer of blocks (e.g., SLC blocks or some other type of blocks) and may utilize the blocks as a cache layer to store host data before the host data is written to the QLC blocks. For example, the memory system 110 may flush data from the cache layer to the QLC blocks as a background process. The cache layer may operate similar to other block devices of the memory system 110 such that data is addressed according to flash logical addresses (FLAs) and translation units (TUs), which may have a size in bytes, kilobytes (KBs), etc. (e.g., an addressable unit of data having a fixed size, such as 4 KB) and an L2P table may provide information about where data is present in NAND storage. In some examples, SLC caching may refer to holding data in SLC NAND memory cells so the data may be migrated to QLC in background (e.g., enabling QLC memory to utilize multi pass programming with a specific page ordering).

In some cases, the memory system 110 may maintain (e.g., in the cache or elsewhere in memory) a two-layer L2P table that maps logical addresses of data to physical addresses within the cache, the memory, or both where the data is stored. The memory system 110 may write to the cache at a first write granularity size, which may correspond to a first size of data (e.g., 16 kilobytes, or some other size of data) supported by the L2P table of the memory system 110. For example, the L2P table may include entries that map data according to the first write granularity. In the case that a size of incoming data indicated via a write command from the host system 105 is not aligned with this size boundary (e.g., the size of the data may be larger than 16 kilobytes, the size of the data may be less than 16 kilobytes), the memory system 110 may perform one or more processes (e.g., a read modify write (RMW) operation) to modify the data such that it may fit the storage criteria before writing the data to the cache. The RMW and other types of operations for modifying data granularity before a write may increase background processes for writing data to the cache, transferring the data to the memory, or both, which may increase write amplification while reducing some aspects of user performance and reducing memory usage efficiency. Thus, techniques for more efficient data storage of varying data transfer sizes may be beneficial.

Figure 2:
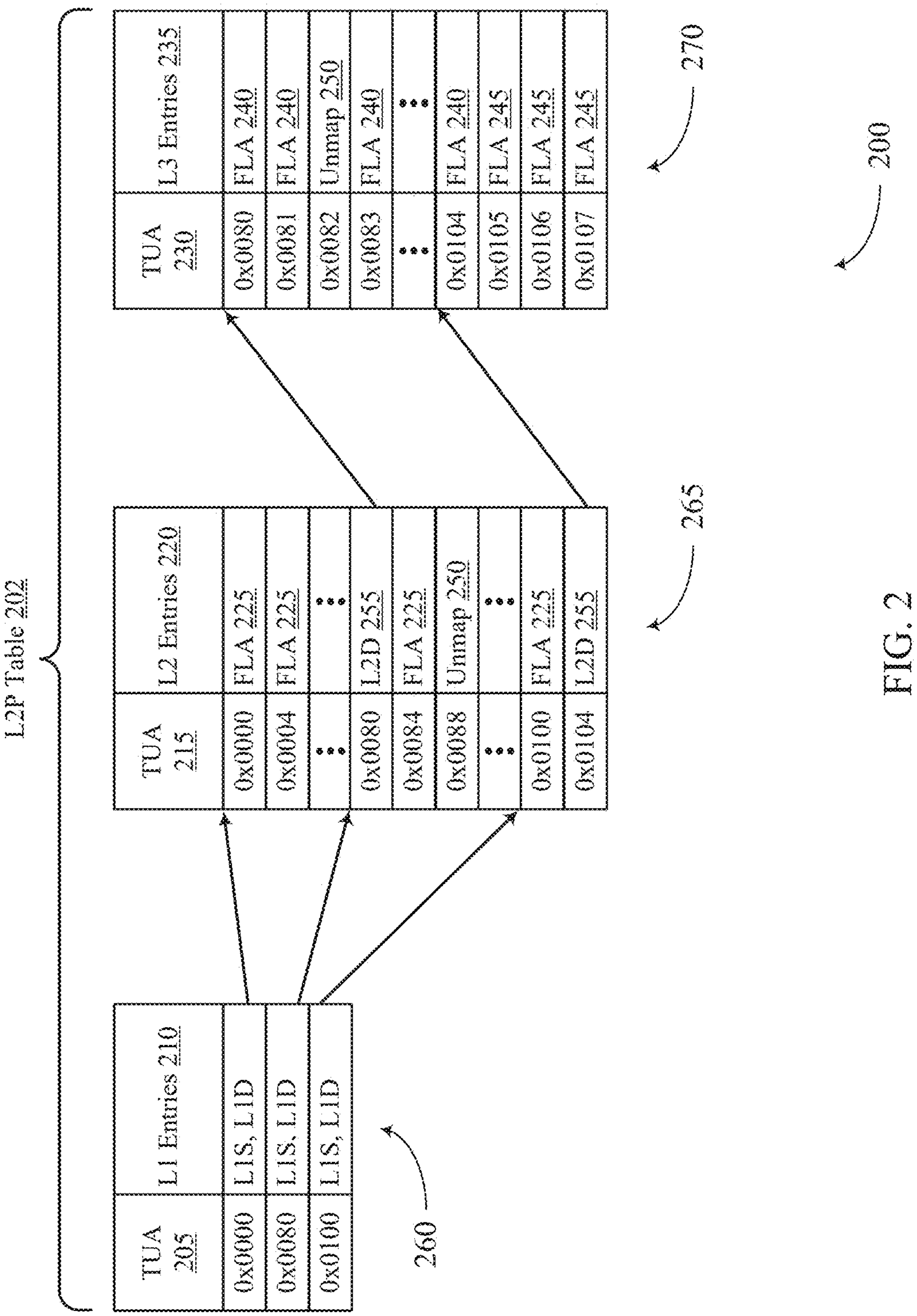
FIG. 2 shows an example of a mapping architecture that supports L2P mapping for enhanced granularity data storage in accordance with examples as disclosed herein.

To improve the performance and memory storage within the memory system 110, the techniques described herein provide for the memory system 110 to support writes according to two or more different sizes. For example, relatively smaller chunks of data may be written relatively frequently to the cache and data may be transferred to the memory using relatively larger chunks of data, or vice versa. The L2P table described herein may include multiple levels to support the varying write sizes within the memory system 110. As described herein, the memory system 110 may include two or more levels of L2P entries such that a finer granularity of data may be stored and tracked without the memory system 110 performing RMW operations. For example, a first level, a second level, or both of the L2P table (e.g., the L1 table, the L2 table) may be associated with larger data granularity sizes, while a third level of the L2P table (e.g., a L3 table) may map finer granularities of data to addresses in the cache, the memory, or both. The first and second levels of the L2P table may be associated with the first data granularity, while the third level of the L2P table may be associated with a second data granularity size that is smaller than the first data granularity. The varying data granularities in the L2P entries may support smaller random writes from a host, at least because smaller chunks of data may be mapped within the L2P entries without performing additional operations, such as RMW operations. The L2P entries that support varying data granularities as described herein may enable better memory usage, as finer data granularity may be stored to the memory system 110 without null padding or otherwise unused memory space, thereby improving memory usage and supporting different applications associated with one or more different data sizes FIG. 2 shows an example of a mapping architecture 200 that supports L2P mapping for enhanced granularity data storage in accordance with examples as disclosed herein. The mapping architecture 200 may implement aspects of the system 100 as described with reference to FIG. 1. For example, the mapping architecture 200 may include an L2P table 202, which may be an example of an L2P table as described with reference to FIG. 1.

A memory system (e.g., an SSD, or other type of memory system) may utilize an SSD cache to temporarily store data before writing the data to NAND memory. The SSD cache may include, for example, one or more SLCs to improve write efficiency and the NAND memory may include one or more QLCs, or some other types of memory cells. In some cases, the memory system may maintain (e.g., in the cache or elsewhere in memory) an L2P table that maps logical addresses of data to physical addresses within the cache, the memory, or both where the data is stored. The memory system may write to the cache and the memory according to a first write granularity (e.g., data transfer size), which may correspond to a first size of data (e.g., 16 kilobytes, or some other size of data) supported by the L2P table of the memory system. For example, the L2P table may include entries that map data according to the first write granularity. In the case that a size of incoming data indicated via a write command from a host system is not aligned with this size boundary (e.g., the size of the data may be larger than 16 k bytes, the size of the data may be less than 16 k bytes), the memory system may perform one or more processes (e.g., an RMW operation) to modify the data such that it may fit the storage criteria before writing the data to the cache. The RMW and other types of operations for modifying data granularity before a write may increase background processes for writing data to the cache, transferring the data to the memory, or both, which may increase write amplification while reducing some aspects of user performance and reducing memory usage efficiency. Thus, techniques for more efficient data storage of varying data transfer sizes may be beneficial.

To improve the performance and memory storage within a memory system, the techniques described herein provide for a memory system to support writes according to two or more different sizes. For example, relatively smaller chunks of data may be written relatively frequently to the cache and data may be transferred to the memory using relatively larger chunks of data, or vice versa. An L2P table 202 described herein may include multiple levels to support the varying write sizes within the system. As described herein, the memory system may include two or more levels of L2P entries such that a finer granularity of data may be stored and tracked without the memory system performing RMW operations. For example, a first level, a second level, or both of the L2P table 202 (e.g., a L1 table 260, a L2 table 265) may be associated with larger data granularity sizes, while a third level of the L2P table 202 (e.g., an L3 table 270) may map finer granularities of data to addresses in the cache, the memory, or both. The first and second levels of the L2P table 202 may be associated with the first data granularity, while the third level of the L2P table 202 may be associated with a second data granularity size that is smaller than the first data granularity. The varying data granularities in the L2P entries (e.g., L1 entries 210, L2 entries 220, L3 entries 235) may support smaller random writes from a host, at least because smaller chunks of data may be mapped within the L2P entries without performing additional operations, such as RMW operations. The L2P entries that support varying data granularities as described herein may enable better memory usage, as finer data granularity may be stored to the memory system without null padding or otherwise unused memory space, thereby improving memory usage and supporting different applications associated with one or more different data sizes.

The L2P table 202 may be associated with various data write granularities. In some examples, the L1 table 260 and the L2 table 265 may be associated with a larger data write granularity than the L3 table 270. For example, the L1 table 260 and the L2 table may be associated with a data write granularity of 48 kilobytes and 16 kilobytes, respectively, or some other granularity, while the L3 table 270 may be associated with a data write granularity of 4 kilobytes. By supporting varying levels of data write granularities, the L2P table 202 may be configured to store L2P entries according to the data transfer size of the associated data in a tiered method. For example, L2P entries associated with data of a relatively small data transfer size may be stored in the L3 table 270 as L3 entries 235, while L2P entries associated with data of a relatively large data transfer size (e.g., larger than the small data transfer size) may be stored in the L1 table 260 and/or the L2 table 265 as L1 entries 210 and L2 entries 220, respectively. Utilizing a tiered architecture with varying granularity may allow the memory system to decrease accesses to the levels of the L2P table 202, as the memory system may access the L1 table 260 and the L2 table 265 when accessing entries associated with the large data write granularity, and may not access the L3 table 270 unless accessing entries associated with the small data write granularity. In some examples, the levels of the L2P table 202 may be associated with various factors of data write granularity. For example, in the case that the L3 table 270 may be associated with a data write granularity of a first value, the L1 table 260 and the L2 table 265 may be associated with data write granularities that are a multiple of that value. For example, the L3 table 270 may be associated with a data write granularity of 4 kilobytes, and the L1 table 260 and the L2 table 265 may be associated with a data write granularity that is four and eight times the data granularity of the L3 table 270 (e.g., 16 kilobytes and 32 kilobytes), or some other factors.

In some examples, an L2P table 202 as described herein may include the L1 table 260. The L1 table 260 may include one or more L1 entries 210 (e.g., a first set of entries) that each correspond to (e.g., are identified by) a respective translation unit address (TUA) 205. A TUA 205 may be based on or otherwise associated with an LBA. For example, a TUA 205 may represent a flat logical address space that may be calculated from one or more parameters (e.g., the namespace ID, or other parameters) and the LBA. In some examples, the L1 table 260 may be sized to cover an entire TUA address space of the memory system (e.g., including the TUAs 205, the TUAs, 215, and the TUAs 230 of the memory system), which may provide for physical mappings of each logical address (e.g., from an LBA to a flash logical address (FLA)) at a relatively high granularity in fast memory. The L1 table 260 may be resident in (e.g., stored) in memory (e.g., non-volatile memory). For example, a size of the memory (e.g., an SSD size) may be configured to include or incorporate at least the L1 table 260 (e.g., in addition to the L2 table 265 and the L3 table 270, in some examples).

In some examples, each of the L1 entries 210 may include information that indicates a state of the L1 table 260 (e.g., LIS), an offset associated with the L2 table 265 (e.g., LID), or a combination thereof, and may each be mapped at a relatively large data granularity size (e.g., 32 kilobytes, or another data granularity size). Each of the L1 entries 210 may point to a range of entries in the L2 table 265. For example, the L1 entry 210 corresponding to the TUA 205 "0x0000" may point to the L2 entry 220 corresponding to the TUA 215 "0x0000" and including the FLA 225. The offset (e.g., LID) in each L1 entry 210 may indicate or otherwise point to a TUA 215 in the L2 table 265 that is associated with the L1 entry. In some examples, the state of the L1 table 260 may be updated in the foreground of the memory system while the memory system may be performing operations using the L2 table 265, which may allow for increased efficiency of the memory system. That is, the memory system may refrain from loading the L2 entries 220 and corresponding information by instead reading the L1 entries 210. If an L1 entry 210 indicates an unmapped state (e.g., L1S=unmapped), the memory system may assume each entry of a set of L2 entries 220 that are mapped to the L1 entry 210 are also unmapped, and the memory system may refrain from reading those L2 entries 220. Additionally, or alternatively, the L1 table 260 may support L2 entry loading operations. For example, the memory system may load an L2 entry 235 in background operations (e.g., or on-demand) in the case that the host system may request the L2 entry 235. In some examples, the address of each of the L1 entries 210 may be calculated by adding the base value of the L1 table 260 and the starting TUA 205, and dividing the result by the size of the range of a set of L2 entries 220 to which the L1 entry 210 maps (e.g., L1 address=(L1_base+TUA/L2 Region Size).

The L2P table 202 may include the L2 table 265. The L2 table 265 may include one or more L2 entries 220 that each correspond to (e.g., are identified by) a respective TUA 215. Each of the L2 entries 220 may include an FLA 225 that maps data to physical addresses in the memory arrays of the memory system, a value that points to a range of L3 entries 235 in the L3 table 270 (e.g., an 0xF0000000 value, an 0xF0000001, or another value that are examples of an L2D indication 255), an unmap indication 250, or other information. In some examples, the memory system may map each of the FLAs 225 of the L2 entries 220 according to a data granularity size of 16 kilobytes (e.g., or another data granularity size corresponding to the data granularity size of the L1 table 260). The L2P table 202 may thereby obtain TUAs 205, 215, and 230, as inputs representative of various logical addresses of data, and may map the TUAs 205, 215, and 230, to respective FLAs 225, 240 associated with physical storage locations.

If the memory system receives an access command associated with data of a data granularity size that is smaller than the data granularity size of the L2 table 265, the memory system may store an L2D indication 255 in the L2 table 265 that points to a range of L3 entries 235 in the L3 table 270. For example, the memory system may store the L2D indication 255 in the L2 entry 220 corresponding to the TUA 215 "0x0080". The L2D indication may point to the L2 entry 235 corresponding to a TUA 230 "0x0080". For example, the L2D indication may include the TUA 230 "0x0080" or information that identifies the TUA 230 "0x0080". The L2 table 265 may additionally, or alternatively, store one or more unmap indications 250. An unmap indication 250 in the L2 table 265 may indicate that a corresponding range of logical addresses (e.g., the first granularity) are unmapped. An unmap indication 250 may include a flash logical address (FLA) encoding (e.g., 0xFFFFFFFF) that identifies the unmapped status. If an L2 entry 220 includes an unmap indication 250, all of the corresponding L3 entries 235 may also be unmapped.

In some examples, the address of each of the L2 entries 220 may be calculated by adding the base value of the L2 table 265, the address indicated via the associated L1 table 260 pointer, the associated TUA 215 divided by four (4) and dividing the result by the size of the L2 table 265 range (e.g., L2 address=(L2_Base+LID pointer+ (TUA/4)) % L2 Region Size). By storing the L2D indications 255, the FLAs 225, and the unmap indications 250 at the L2 table 265, the memory system may increase the efficiency of the L2P table 202. For example, if data is written at the first data granularity size associated with the L2 table 265, the L2 entries 220 may map the data and the memory system may refrain from retrieving or otherwise accessing the L3 entries 235. However, the L3 table 270 described herein may provide for mapping of data that is written at a reduced granularity, such as a second data granularity size that is smaller than the first data granularity size of the L2 entries 220.

The L2P table 202 may include the L3 table 270. The L3 table 270 may include one or more L3 entries 235 that each correspond to (e.g., are identified by) a respective TUA 230. In some examples, the TUAs 230 of the L3 table 270 may be associated with (e.g., located in) the L1 table 260 along with the TUAs 215 of the L2 table 265. the L3 entries 235 may include an FLA 240 that maps data to physical addresses in the cache of the memory system, an FLA 245 that maps data to physical addresses in the memory arrays of the memory system, an unmap indication 250, or a combination thereof (e.g., or another indication). The L3 table 270 may be mapped at a data granularity size that may be smaller than the data granularity of the L1 table 260 and the L2 table 265 (e.g., or a finer data granularity size than the data granularity size of the L1 table 260 and the L2 table 265), such that the L2P table 202 may map a finer granularity of data to the cache. In some examples, each of the L2 entries 220 may be associated with a subset of one or more of the L3 entries 235, and a quantity of the L2 entries 220 may be less than a quantity of the L3 entries 235. That is, the range of FLAs 225 associated with the L2 entries 220 may be less than the range of FLAs 240 (e.g., and FLAs 245) associated with the L3 entries 235. In some examples, the L2 entries 220 may be associated with the TUAs 215 and the TUAs 230 or an entire TUA address range of the drive. The L3 entries 235 may be associated with a subset of the TUAs (e.g., the TUAs 230). Additionally, or alternatively, a quantity of the L1 entries 210 may be less than a quantity of the L2 entries 220.

The L2 table 265 and the L2D indications 255 of the L2 entries 220 may be associated with one or more reserved FLAs 225 that are between a maximum valid FLA utilized to address the memory arrays of the memory system and one or more FLAs 225 allocated for one or more special codes used to indicate various other states (e.g., the unmap state). The L3 table 270 may include valid FLAs 240 or unmap indications 250, while the L2 table 265 may include the one or more reserved FLAs (e.g., FLAs 225) that may be utilized in mapping the L2 entries 220 of the L2 table 265 to the L3 entries 235 of the L3 table 270. If the memory system receives an access command associated with a data granularity that is smaller than the data granularity supported by the L2 table 265, the memory system may access the allocated FLAs 240 for the L3 table 270. The allocated FLAs 240 may be indexed as sequential entries of the L3 table 270 and pointed to by one or more of the L2 entries 220 (e.g., and thus an entry of the L1 table 260). For example, the FLA 240 stored in the L3 entry 235 corresponding to the TUA 230 "0x0080" may be pointed to by the L2 entry 220 corresponding to the TUA 215 "0x0080", which may be pointed to by the L1 entry 210 corresponding to the TUA 205 "0x0080". If the memory system looks up the L2P table 202 and determines the FLA 240 in the L2 table 265 to be below the maximum valid FLA (e.g., 0xF0000000), the memory system may be directed to the target address within the one or more memory arrays (e.g., array address). If the L2 entry 220 includes an unmap indication 250, the memory system may return 0s or Is to the host. If the FLA 225 in the L2 table 265 is above the maximum valid FLA and is different than the unmap FLA, the memory system may also utilize the L2 entry 220 and corresponding FLA 225 to calculate a location of the L3 entry 235 the L2 entry 220 points to. In some examples, the address of the L3 entry 235 may be calculated by adding the base value of the L3 table 270 (e.g., a starting address for the L3 table 270), a difference between the address of the associated L2 table 265 pointer and the maximum valid FLA, and the associated TUA 230 divided by four (4) (e.g., L3 address=L3_Base+L2D pointer-0xF0000000+TUA % 4).

In the case that an access command is received and indicates one or more LBAs, the memory system may refer to the entries of the L1 table 260, the L2 table 265, the L3 table 270, or a combination thereof using the one or more indicated LBAs of the associated data to determine (e.g., identify) associated physical address of the data in the memory system. For example, the memory system may receive one or more access commands from the host system. The one or more access commands may be an example of a write command including data to be stored in one or more memory arrays of the memory system, and an LBA associated with the data. In some examples, the write command may be associated with a first data transfer size (e.g., a first data granularity size, a 4 k-byte granularity size).

In response to receiving the write command, the memory system may allocate one or more FLAs for one or more blocks of memory in the L2P table 202. For example, in the case that the write command may be associated with the first data transfer size (e.g., 4 kilobyte granularity), the memory system may allocate one or more entries of the L3 entries 235 for the mapping data associated with data of the write command.

The memory system may identify one or more entries of the L2P table 202. The L2 entries 220 may be associated with a second data transfer size (e.g., a second data granularity size, a 16 kilobyte granularity size) and may map a range of FLAs (e.g., the FLAs 225) to second data stored in the memory system. In some examples, the second data may include one or more associated physical addresses, a pointer to a subset of the L3 entries 235, or a combination thereof. Based on the write command being associated with the first data transfer size, the memory system may utilize an entry of the L1 entries 210 that may include an FLA indicated in the write command associated with second data stored in the arrays of the memory system. The memory system may utilize the FLA and the L1 entry 210 to identify a range of entries of the L2 entries 220 that includes the FLA. The memory system may utilize the starting FLA of the range of FLAs mapped by the L2 entry to locate a starting L3 entry 235 of a range of entries in the L3 table 270. For example, the entry associated with the TUA 215 "0x0088" (e.g., the L2D indication 255) may include a starting FLA that points to the entry of the L3 entries 235 that is associated with the TUA 230 "0x0080" (e.g., the FLA 240).

In response to receiving the write command and identifying the mapping information of the L2 entry 220 that points to the starting entry of the L3 entries 235 (e.g., the entry corresponding to TUA 230 "0x0080"), the memory system may store at least one entry to the L3 table 270 (e.g., a second entry) that maps the LBA associated with the write command (e.g., and the data associated with the first data transfer size) to one or more first physical addresses in the cache. That is, the L3 entries 235 pointed to by the L2 entry 220 may each map a respective range of FLAs (e.g., the FLAs 240) to a respective one or more physical addresses in the cache according to the first data transfer size (e.g., the 4 k-byte granularity size). In the case that the first data is associated with a size that is larger than the size of the first data transfer size (e.g., four times larger, for example), but is smaller than the size of the second data transfer size associated with the L2 table 265, the memory system may store two or more entries to the L3 table 270. In some cases, the memory system may overwrite previously-written L3 entries 235 that may be mapped to data in the memory arrays. For example, the FLAs 245 in the L3 entries 235 may be associated with data written to the memory arrays. The memory system may overwrite one or more of the FLAs 245 with the FLAs 240, such that the range of L3 entries 235 pointed to by an L2 entry 220 may include both L3 entries 235 mapped to data in the cache and L3 entries 235 mapped to data in the memory arrays.

The memory system may write the first data of the write command to the physical addresses in the cache. For example, based on the entry of the L2 table 265 pointing to the one or more entries of the L3 table 270, the memory system may store the first data to the physical addresses of the cache mapped to by the range of FLAs (e.g., the FLAs 240) associated with the L3 entries 235.

The memory system may transfer the first data from the cache to memory arrays of the memory system. For example, based on writing the data to the cache, the memory system may transfer the data to one or more of the memory arrays of the memory system according to the second data transfer size (e.g., in the case that the memory arrays support data storage according to the second data transfer size). In some examples, the memory system may transfer the first data to the memory arrays based on a quantity of the L3 entries 235 satisfying a threshold quantity of entries. For example, once a range of L3 entries 235 associated with a single L2 entry 220 is full of mapped data in the cache, the memory system may transfer the cached data to the memory arrays. In response to transferring the first data to the one or more memory arrays, the memory system may update one or more entries of the L2P table 202. For example, based on transferring the first data to the memory arrays, the memory system may update the associated L3 entries 235 and the L2 entries 220 to map the FLAs associated with the first data to the one or more physical addresses in the one or more memory arrays. That is, the memory system may update the L2 entry 220 and the associated L3 entries 235 to point to the physical addresses of the data in the memory arrays.

If the host system issues a write command associated with the second data transfer size (e.g., second granularity), the memory system may map the data using one or more L2 entries 220 and may not utilize the L3 entries 235 for the mapping. That is, because the write may be aligned with the L2 granularity, the memory system may reduce latency and overhead by refraining from using the L3 entries 235. In some examples, the memory system may receive a second write command. The second write command may include data for storage in the one or more memory arrays according to the second data transfer size, and one or more associated LBAs. In the case that the data of the second write command is associated with the second data transfer size, the memory system may store another entry in the L2 table 265 that maps the LBA associated with the data of the second write command to one or more physical addresses in the cache (e.g., to one or more FLAs). Because the data transfer size associated with the data of the second write command corresponds to the data transfer size of the L2 table 265 (e.g., a 16 k-byte granularity), the memory system may refrain from storing associated entries in the L3 table 270.

Adding the L3 table 270 to the L2P table 202 may enable improved memory usage as compared with systems that do not support the same granularity of L2P mapping, at least because the finer data granularity associated with the third level of the L2P table 202 may result in increased efficiency in memory utilization. For example, the memory system may refrain from padding smaller chunks of data with null data to fill out a full data transfer size for L2P mapping purposes. Additionally, or alternatively, the use of the L3 table 270 may decrease write amplification, at least because the memory system may refrain from or delay performing additional writes to adjust a data size, which may increase host random write performance and overall efficiency. In some examples, the additional L2P mapping granularity may further support improved variability of memory applications, at least because the memory system may support write operations of varying sizes and speeds from various different applications.

Figure 3:
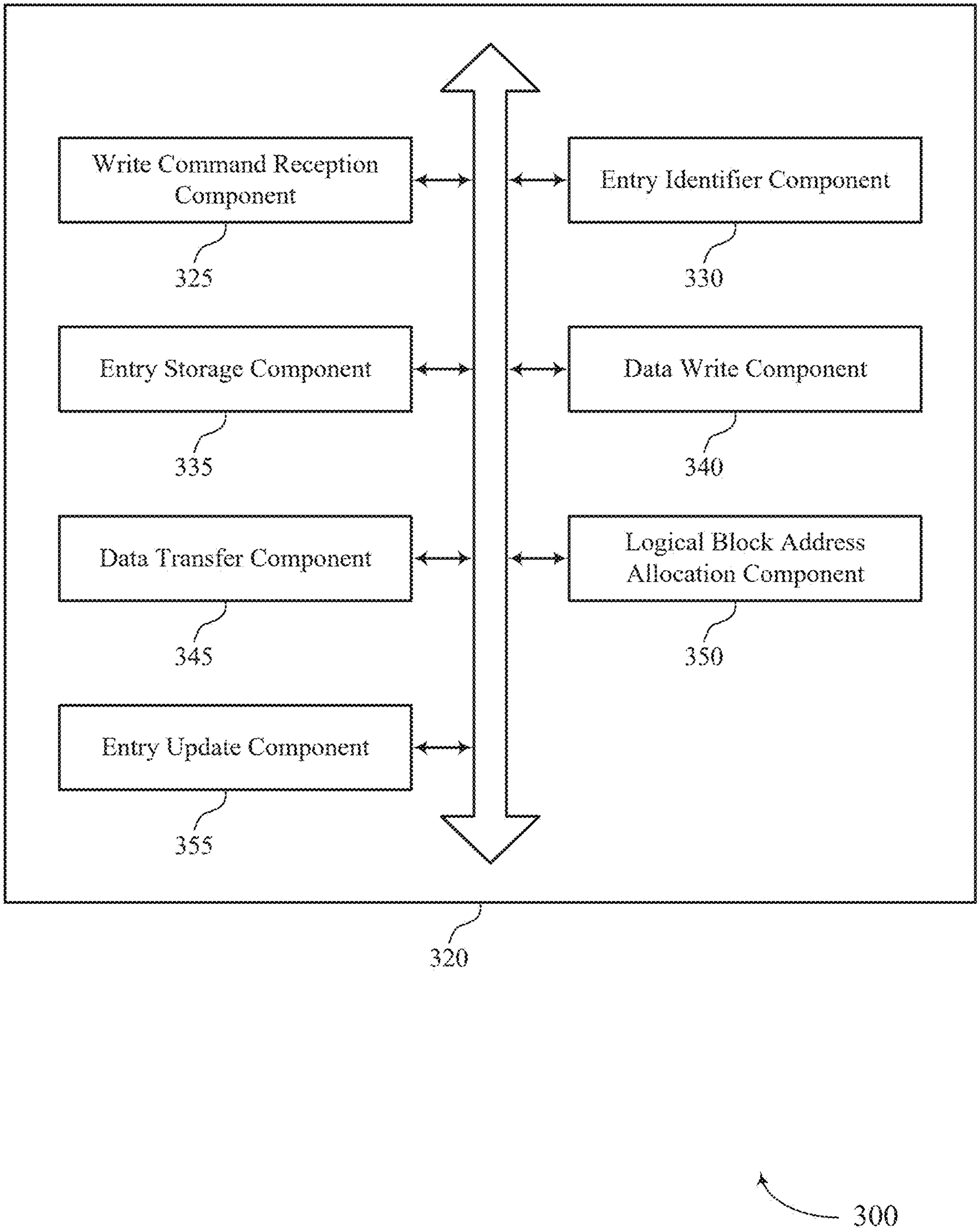
FIG. 3 shows a block diagram of a memory system that supports L2P mapping for enhanced granularity data storage in accordance with examples as disclosed herein.

FIG. 3 shows a block diagram 300 of a memory system 320 that supports logical-to-physical mapping for enhanced granularity data storage in accordance with examples as disclosed herein. The memory system 320 may be an example of aspects of a memory system as described with reference to FIGS. 1 and 2. The memory system 320, or various components thereof, may be an example of means for performing various aspects of logical-to-physical mapping for enhanced granularity data storage as described herein. For example, the memory system 320 may include a write command reception component 325, an entry identifier component 330, an entry storage component 335, a data write component 340, a data transfer component 345, a logical block address allocation component 350, an entry update component 355, or any combination thereof. Each of these components, or components of subcomponents thereof (e.g., one or more processors, one or more memories), may communicate, directly or indirectly, with one another (e.g., via one or more buses).

The write command reception component 325 may be configured as or otherwise support a means for receiving, by a memory system, one or more write commands including first data and a logical block address associated with the first data, the first data for storage in one or more memory arrays of the memory system according to a first data transfer size. The entry identifier component 330 may be configured as or otherwise support a means for identifying, in a cache of the memory system based at least in part on the one or more write commands, a first entry including mapping information that maps a range of logical block addresses to second data stored in the memory system according to a second data transfer size that is greater than the first data transfer size, the range of logical block addresses including the logical block address associated with the first data. The entry storage component 335 may be configured as or otherwise support a means for storing, based at least in part on the second data transfer size being greater than the first data transfer size, at least one second entry that maps the logical block address associated with the first data having the first data transfer size to one or more first physical addresses in the cache. The data write component 340 may be configured as or otherwise support a means for writing the first data to the one or more first physical addresses in the cache based at least in part on the first entry and the at least one second entry.

In some examples, the data transfer component 345 may be configured as or otherwise support a means for transferring, after writing the first data to the one or more first physical addresses in the cache and based at least in part on the first entry and the second entry, the first data to the one or more memory arrays of the memory system according to the second data transfer size, where the one or more memory arrays support data storage according to the second data transfer size.

In some examples, to support transferring the first data, the data transfer component 345 may be configured as or otherwise support a means for transferring the first data to the one or more memory arrays based at least in part on a quantity of second entries, including the at least one second entry, satisfies a threshold quantity, the quantity of second entries including second entries that are associated with the first entry in the cache and that map respective logical block addresses to respective physical addresses in the cache.

In some examples, the entry update component 355 may be configured as or otherwise support a means for updating, based at least in part on transferring the first data to the one or more memory arrays, the first entry, the second entry, or both to map the logical block address associated with the first data to one or more second physical addresses in the one or more memory arrays.

In some examples, the logical block address allocation component 350 may be configured as or otherwise support a means for allocating one or more logical block addresses for one or more blocks of memory in the cache based at least in part on the one or more write commands, where identifying the first entry is based at least in part on allocating the one or more logical block addresses.

In some examples, the second entry is one of a plurality of second entries that each map a respective first range of logical block addresses to a respective one or more first physical addresses in the cache according to the first data transfer size, the first entry is one of a plurality of first entries that each map a respective second range of logical block addresses to respective second data according to the second data transfer size, the respective second data including a respective one or more second physical addresses, a pointer to a subset of the plurality of second entries, or both, and the respective first ranges include fewer logical block addresses than the respective second ranges.

In some examples, each first entry of the plurality of first entries is associated with a respective subset of one or more second entries of the plurality of second entries, and a first quantity of the plurality of first entries is less than a second quantity of the plurality of second entries.

In some examples, the memory system stores a plurality of third entries that each map a respective third range of logical block addresses to respective third data according to a third data transfer size, each third entry of the plurality of third entries is mapped to a respective subset of one or more first entries of the plurality of first entries, and a third quantity of the plurality of third entries is less than a first quantity of the plurality of first entries.

In some examples, a starting logical block address of the range of logical block addresses mapped by the first entry points to the second entry.

In some examples, to support storing the at least one second entry, the entry storage component 335 may be configured as or otherwise support a means for storing two second entries based at least in part on a size of the first data including two of the first data transfer size.

In some examples, the write command reception component 325 may be configured as or otherwise support a means for receiving one or more second write commands including third data and one or more second logical block addresses associated with the third data, the third data for storage in the one or more memory arrays of the memory system according to the second data transfer size. In some examples, the entry storage component 335 may be configured as or otherwise support a means for storing another first entry that maps the one or more second logical block addresses associated with the third data having the second data transfer size to one or more second physical addresses in the cache.

In some examples, the cache includes one or more single level cell (SLC) memory cells. In some examples, the one or more memory arrays include one or more multiple-level cell (MLC) memory cells.

In some examples, the cache includes volatile memory, non-volatile memory, or any combination thereof.

In some examples, the described functionality of the memory system 320, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 320, or various components thereof, may be implemented at least in part by instructions (e.g., stored in memory, non-transitory computer-readable medium) executable by such at least one processor.

Figure 4:
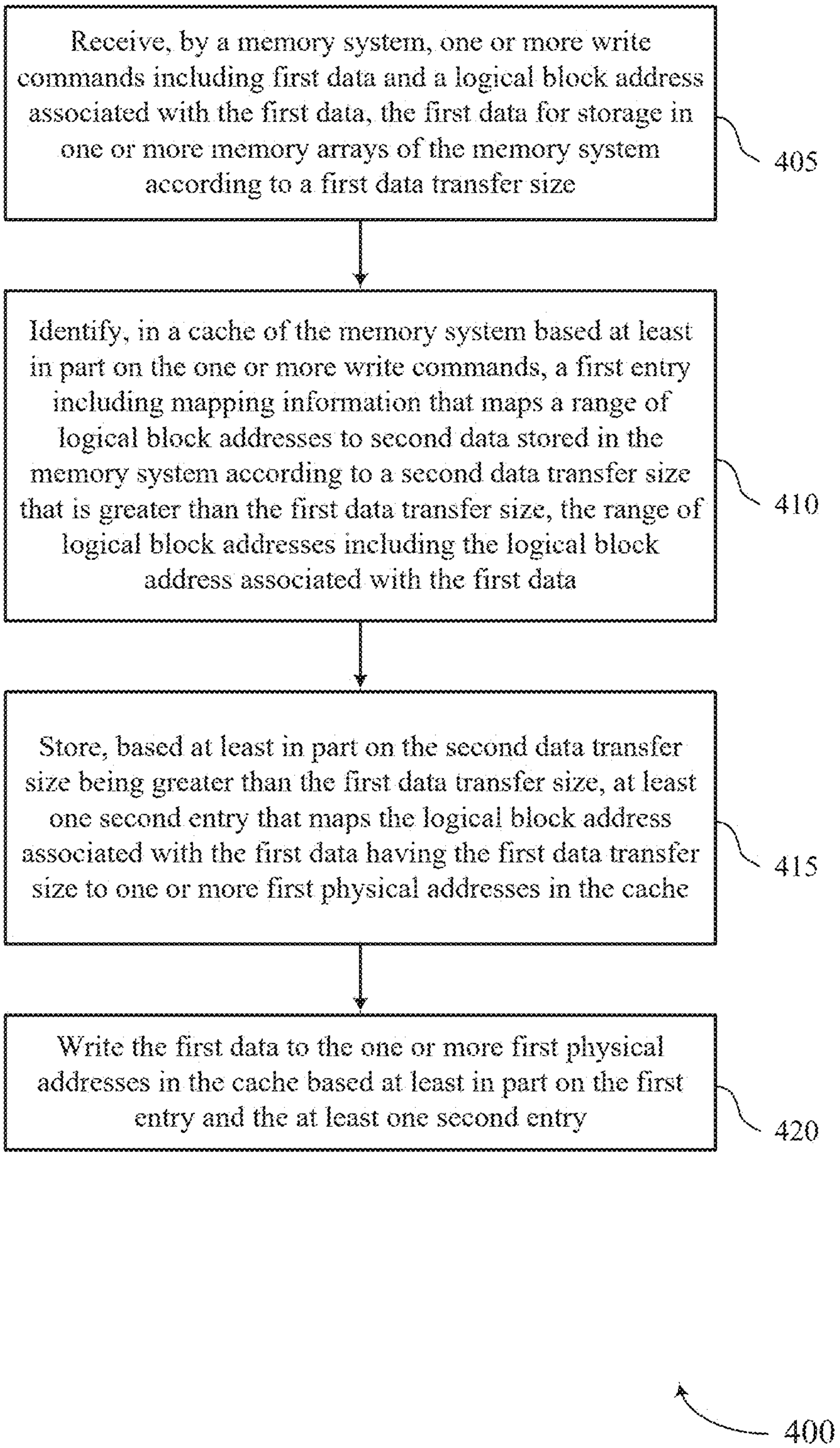
FIG. 4 shows a flowchart illustrating a method or methods that support L2P mapping for enhanced granularity data storage in accordance with examples as disclosed herein.

FIG. 4 shows a flowchart illustrating a method 400 that supports logical-to-physical mapping for enhanced granularity data storage in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include receiving, by a memory system, one or more write commands including first data and a logical block address associated with the first data, the first data for storage in one or more memory arrays of the memory system according to a first data transfer size. In some examples, aspects of the operations of 405 may be performed by a write command reception component 325 as described with reference to FIG. 3.

At 410, the method may include identifying, in a cache of the memory system based at least in part on the one or more write commands, a first entry including mapping information that maps a range of logical block addresses to second data stored in the memory system according to a second data transfer size that is greater than the first data transfer size, the range of logical block addresses including the logical block address associated with the first data. In some examples, aspects of the operations of 410 may be performed by an entry identifier component 330 as described with reference to FIG. 3.

At 415, the method may include storing, based at least in part on the second data transfer size being greater than the first data transfer size, at least one second entry that maps the logical block address associated with the first data having the first data transfer size to one or more first physical addresses in the cache. In some examples, aspects of the operations of 415 may be performed by an entry storage component 335 as described with reference to FIG. 3.

At 420, the method may include writing the first data to the one or more first physical addresses in the cache based at least in part on the first entry and the at least one second entry. In some examples, aspects of the operations of 420 may be performed by a data write component 340 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a memory system, one or more write commands including first data and a logical block address associated with the first data, the first data for storage in one or more memory arrays of the memory system according to a first data transfer size; identifying, in a cache of the memory system based at least in part on the one or more write commands, a first entry including mapping information that maps a range of logical block addresses to second data stored in the memory system according to a second data transfer size that is greater than the first data transfer size, the range of logical block addresses including the logical block address associated with the first data; storing, based at least in part on the second data transfer size being greater than the first data transfer size, at least one second entry that maps the logical block address associated with the first data having the first data transfer size to one or more first physical addresses in the cache; and writing the first data to the one or more first physical addresses in the cache based at least in part on the first entry and the at least one second entry.

Aspect 2: The method, apparatus, or non-transitory computer-readable medium of aspect 1, further including operations, features, circuitry, logic, means, or instructions, or any combination thereof for transferring, after writing the first data to the one or more first physical addresses in the cache and based at least in part on the first entry and the second entry, the first data to the one or more memory arrays of the memory system according to the second data transfer size, where the one or more memory arrays support data storage according to the second data transfer size.

Aspect 3: The method, apparatus, or non-transitory computer-readable medium of aspect 2, where transferring the first data includes operations, features, circuitry, logic, means, or instructions, or any combination thereof for transferring the first data to the one or more memory arrays based at least in part on a quantity of second entries, including the at least one second entry, satisfies a threshold quantity, the quantity of second entries including second entries that are associated with the first entry in the cache and that map respective logical block addresses to respective physical addresses in the cache.

Aspect 4: The method, apparatus, or non-transitory computer-readable medium of any of aspects 2 through 3, further including operations, features, circuitry, logic, means, or instructions, or any combination thereof for updating, based at least in part on transferring the first data to the one or more memory arrays, the first entry, the second entry, or both to map the logical block address associated with the first data to one or more second physical addresses in the one or more memory arrays.

Aspect 5: The method, apparatus, or non-transitory computer-readable medium of any of aspects 1 through 4, further including operations, features, circuitry, logic, means, or instructions, or any combination thereof for allocating one or more logical block addresses for one or more blocks of memory in the cache based at least in part on the one or more write commands, where identifying the first entry is based at least in part on allocating the one or more logical block addresses.

Aspect 6: The method, apparatus, or non-transitory computer-readable medium of any of aspects 1 through 5, where the second entry is one of a plurality of second entries that each map a respective first range of logical block addresses to a respective one or more first physical addresses in the cache according to the first data transfer size, the first entry is one of a plurality of first entries that each map a respective second range of logical block addresses to respective second data according to the second data transfer size, the respective second data including a respective one or more second physical addresses, a pointer to a subset of the plurality of second entries, or both, and the respective first ranges include fewer logical block addresses than the respective second ranges.

Aspect 7: The method, apparatus, or non-transitory computer-readable medium of aspect 6, where each first entry of the plurality of first entries is associated with a respective subset of one or more second entries of the plurality of second entries, and a first quantity of the plurality of first entries is less than a second quantity of the plurality of second entries.

Aspect 8: The method, apparatus, or non-transitory computer-readable medium of any of aspects 6 through 7, where the memory system stores a plurality of third entries that each map a respective third range of logical block addresses to respective third data according to a third data transfer size, each third entry of the plurality of third entries is mapped to a respective subset of one or more first entries of the plurality of first entries, and a third quantity of the plurality of third entries is less than a first quantity of the plurality of first entries.

Aspect 9: The method, apparatus, or non-transitory computer-readable medium of any of aspects 1 through 8, where a starting logical block address of the range of logical block addresses mapped by the first entry points to the second entry.

Aspect 10: The method, apparatus, or non-transitory computer-readable medium of any of aspects 1 through 9, where storing the at least one second entry includes operations, features, circuitry, logic, means, or instructions, or any combination thereof for storing two second entries based at least in part on a size of the first data including two of the first data transfer size.

Aspect 11: The method, apparatus, or non-transitory computer-readable medium of any of aspects 1 through 10, further including operations, features, circuitry, logic, means, or instructions, or any combination thereof for receiving one or more second write commands including third data and one or more second logical block addresses associated with the third data, the third data for storage in the one or more memory arrays of the memory system according to the second data transfer size and storing another first entry that maps the one or more second logical block addresses associated with the third data having the second data transfer size to one or more second physical addresses in the cache.

Aspect 12: The method, apparatus, or non-transitory computer-readable medium of any of aspects 1 through 11, where the cache includes one or more single level cell (SLC) memory cells and the one or more memory arrays include one or more multiple-level cell (MLC) memory cells.

Aspect 13: The method, apparatus, or non-transitory computer-readable medium of any of aspects 1 through 12, where the cache includes volatile memory, non-volatile memory, or any combination thereof.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: A memory system, including: one or more caches including a plurality of memory cells of a first type; one or more memory arrays coupled with the one or more caches and including a plurality of memory cells of a second type; and processing circuitry configured to: receive one or more write commands including first data and a logical block address associated with the first data, the first data for storage in the one or more memory arrays according to a first data transfer size; identify, in a cache of the one or more caches based at least in part on the one or more write commands, a first entry including mapping information that maps a range of logical block addresses to second data stored in the memory system according to a second data transfer size that is greater than the first data transfer size, the range of logical block addresses including the logical block address associated with the first data; store, based at least in part on the second data transfer size being greater than the first data transfer size, at least one second entry that maps the logical block address associated with the first data having the first data transfer size to one or more first physical addresses in the cache; and write the first data to the one or more first physical addresses in the cache based at least in part on the first entry and the at least one second entry.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more caches comprising a plurality of memory cells of a first type;

one or more memory arrays coupled with the one or more caches and comprising a plurality of memory cells of a second type; and processing circuitry configured to:

receive, by the memory system, one or more write commands comprising first data and a logical block address associated with the first data, the first data for storage in the one or more memory arrays of the memory system according to a first data transfer size;

identify, in a cache of the memory system based at least in part on the one or more write commands, a first entry comprising mapping information that maps a range of logical block addresses to second data stored in the memory system according to a second data transfer size that is greater than the first data transfer size, the range of logical block addresses comprising the logical block address associated with the first data;

store, based at least in part on the second data transfer size being greater than the first data transfer size, at least one second entry that maps the logical block address associated with the first data having the first data transfer size to one or more first physical addresses in the cache; and write the first data to the one or more first physical addresses in the cache based at least in part on the first entry and the at least one second entry.

2. The memory system of claim 1, wherein the processing circuitry is further configured to cause the memory system to:

transfer, after writing the first data to the one or more first physical addresses in the cache and based at least in part on the first entry and the second entry, the first data to the one or more memory arrays of the memory system according to the second data transfer size, wherein the one or more memory arrays support data storage according to the second data transfer size.

3. The memory system of claim 2, wherein transferring the first data comprises transferring the first data to the one or more memory arrays based at least in part on a quantity of second entries, comprising the at least one second entry, satisfies a threshold quantity, the quantity of second entries comprising second entries that are associated with the first entry in the cache and that map respective logical block addresses to respective physical addresses in the cache.

4. The memory system of claim 2, wherein the processing circuitry is further configured to cause the memory system to:

update, based at least in part on transferring the first data to the one or more memory arrays, the first entry, the second entry, or both to map the logical block address associated with the first data to one or more second physical addresses in the one or more memory arrays.

5. The memory system of claim 1, wherein the processing circuitry is further configured to cause the memory system to:

allocate one or more logical block addresses for one or more blocks of memory in the cache based at least in part on the one or more write commands, wherein identifying the first entry is based at least in part on allocating the one or more logical block addresses.

6. The memory system of claim 1, wherein:

the second entry is one of a plurality of second entries that each map a respective first range of logical block addresses to a respective one or more first physical addresses in the cache according to the first data transfer size, the first entry is one of a plurality of first entries that each map a respective second range of logical block addresses to respective second data according to the second data transfer size, the respective second data comprising a respective one or more second physical addresses, a pointer to a subset of the plurality of second entries, or both, and the respective first ranges comprise fewer logical block addresses than the respective second ranges.

7. The memory system of claim 6, wherein:

each first entry of the plurality of first entries is associated with a respective subset of one or more second entries of the plurality of second entries, and a first quantity of the plurality of first entries is less than a second quantity of the plurality of second entries.

8. The memory system of claim 6, wherein:

the memory system stores a plurality of third entries that each map a respective third range of logical block addresses to respective third data according to a third data transfer size, each third entry of the plurality of third entries is mapped to a respective subset of one or more first entries of the plurality of first entries, and a third quantity of the plurality of third entries is less than a first quantity of the plurality of first entries.

9. The memory system of claim 1, wherein a starting logical block address of the range of logical block addresses mapped by the first entry points to the second entry.

10. The memory system of claim 1, wherein storing the at least one second entry comprises storing two second entries based at least in part on a size of the first data comprising two of the first data transfer size.

11. The memory system of claim 1, wherein the processing circuitry is further configured to cause the memory system to:

receive one or more second write commands comprising third data and one or more second logical block addresses associated with the third data, the third data for storage in the one or more memory arrays of the memory system according to the second data transfer size; and store another first entry that maps the one or more second logical block addresses associated with the third data having the second data transfer size to one or more second physical addresses in the cache.

12. The memory system of claim 1, wherein:

the cache comprises one or more single level cell (SLC) memory cells, and the one or more memory arrays comprise one or more multiple-level cell (MLC) memory cells.

13. The memory system of claim 1, wherein the cache comprises volatile memory, non-volatile memory, or any combination thereof.

14. A method, comprising:

receiving, by a memory system, one or more write commands comprising first data and a logical block address associated with the first data, the first data for storage in one or more memory arrays of the memory system according to a first data transfer size;

identifying, in a cache of the memory system based at least in part on the one or more write commands, a first entry comprising mapping information that maps a range of logical block addresses to second data stored in the memory system according to a second data transfer size that is greater than the first data transfer size, the range of logical block addresses comprising the logical block address associated with the first data;

storing, based at least in part on the second data transfer size being greater than the first data transfer size, at least one second entry that maps the logical block address associated with the first data having the first data transfer size to one or more first physical addresses in the cache; and writing the first data to the one or more first physical addresses in the cache based at least in part on the first entry and the at least one second entry.

15. The method of claim 14, further comprising:

transferring, after writing the first data to the one or more first physical addresses in the cache and based at least in part on the first entry and the second entry, the first data to the one or more memory arrays of the memory system according to the second data transfer size, wherein the one or more memory arrays support data storage according to the second data transfer size.

16. The method of claim 15, wherein transferring the first data comprises:

transferring the first data to the one or more memory arrays based at least in part on a quantity of second entries, comprising the at least one second entry, satisfies a threshold quantity, the quantity of second entries comprising second entries that are associated with the first entry in the cache and that map respective logical block addresses to respective physical addresses in the cache.

17. The method of claim 15, further comprising:

updating, based at least in part on transferring the first data to the one or more memory arrays, the first entry, the second entry, or both to map the logical block address associated with the first data to one or more second physical addresses in the one or more memory arrays.

18. The method of claim 14, further comprising:

allocating one or more logical block addresses for one or more blocks of memory in the cache based at least in part on the one or more write commands, wherein identifying the first entry is based at least in part on allocating the one or more logical block addresses.

19. The method of claim 14, wherein:

the second entry is one of a plurality of second entries that each map a respective first range of logical block addresses to a respective one or more first physical addresses in the cache according to the first data transfer size, the first entry is one of a plurality of first entries that each map a respective second range of logical block addresses to respective second data according to the second data transfer size, the respective second data comprising a respective one or more second physical addresses, a pointer to a subset of the plurality of second entries, or both, and the respective first ranges comprise fewer logical block addresses than the respective second ranges.

20. A non-transitory computer-readable medium storing code, the code comprising instructions executable by one or more processors to:

receive, by a memory system, one or more write commands comprising first data and a logical block address associated with the first data, the first data for storage in one or more memory arrays of the memory system according to a first data transfer size;

identify, in a cache of the memory system based at least in part on the one or more write commands, a first entry comprising mapping information that maps a range of logical block addresses to second data stored in the memory system according to a second data transfer size that is greater than the first data transfer size, the range of logical block addresses comprising the logical block address associated with the first data;

store, based at least in part on the second data transfer size being greater than the first data transfer size, at least one second entry that maps the logical block address associated with the first data having the first data transfer size to one or more first physical addresses in the cache; and write the first data to the one or more first physical addresses in the cache based at least in part on the first entry and the at least one second entry.

* * * * *